Figures 2, 3:
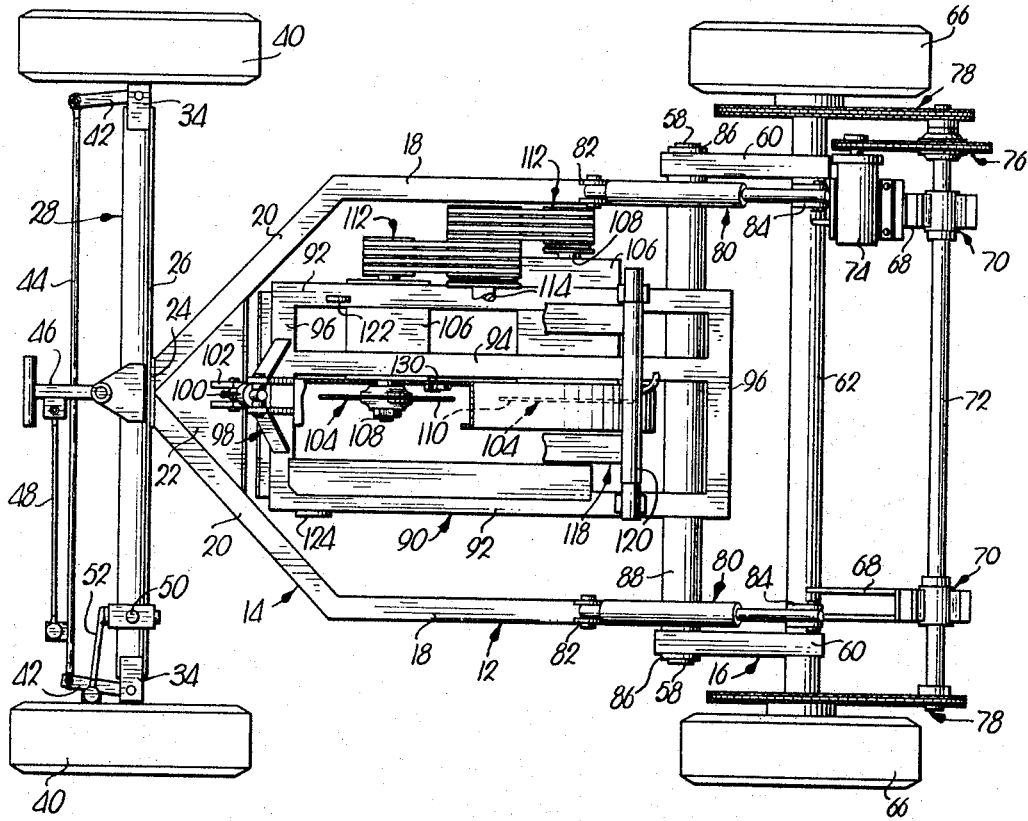

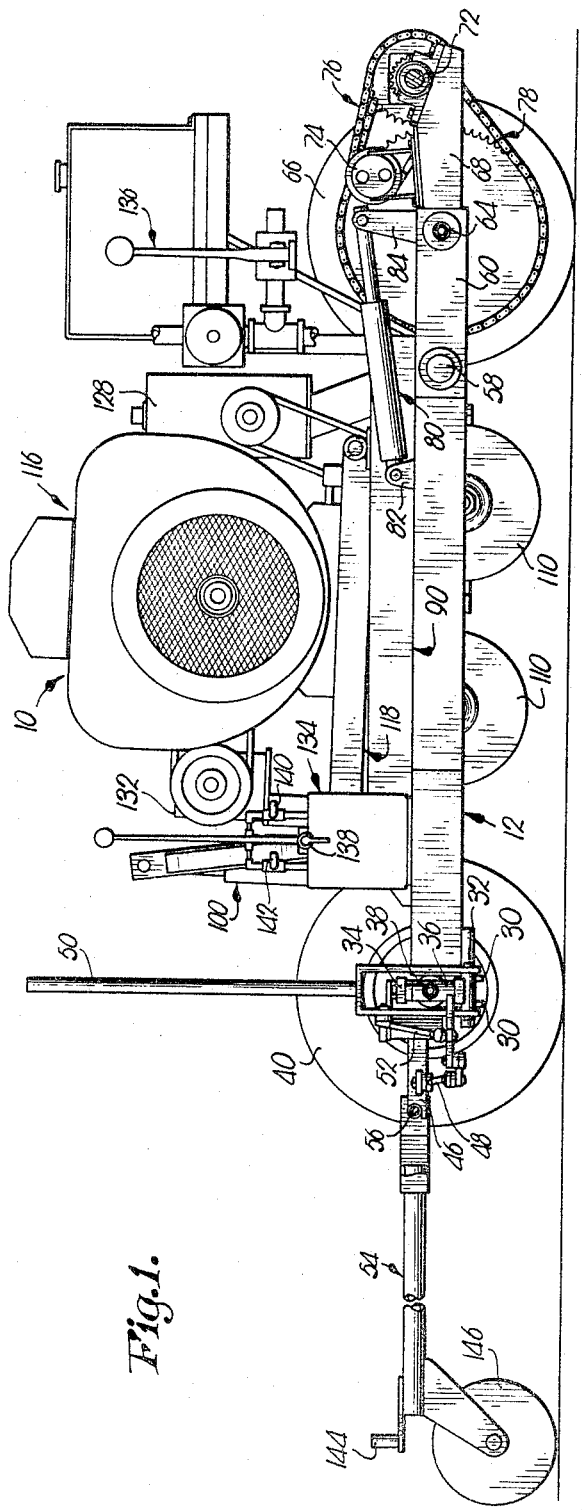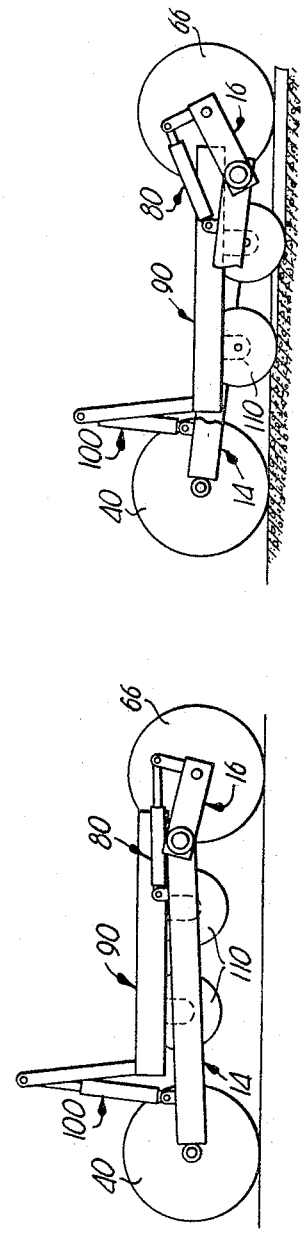

Aug. 1, 1967  H. W. RHODES  3,333,897
ADJUSTABLE VEHICLE FRAME FOR CONCRETE GROOVE CUTTER
Filed April 2, 1965  2 Sheets-Sheet 2

INVENTOR.
Harry W. Rhodes
BY
Hovey, Schmidt, Johnson & Hovey
ATTORNEYS.

United States Patent Office 3,333,897
Patented Aug. 1, 1967

3,333,897
ADJUSTABLE VEHICLE FRAME FOR CONCRETE GROOVE CUTTER
Harry W. Rhodes, Kansas City, Mo., assignor to Clipper Manufacturing Company, Inc., Grandview, Mo., a corporation of Massachusetts
Filed Apr. 2, 1965, Ser. No. 445,077
4 Claims. (Cl. 299—39)

This invention relates to concrete saws and, more particularly, to a saw especially suited for cutting longitudinal grooves along the center line of pavement slabs.

The advantages to be derived from cutting grooves in concrete slabs have long been known. Generally, these grooves are to provide planes of weakness extending transversely through the slab along which the latter will crack under the influence of environmental conditions such as temperature variations and the like. These cracks at predetermined locations prevent the occurrence of random, and consequently difficult to seal cracks in the slab. Further, load-supporting and transmitting joint elements can be precast into the slab which interrelate the slab segments when the cracks are caused to occur at predetermined locations on the slab.

The depth of the grooves in the slab necessary to provide proper planes of weakness may vary from slab-to-slab. It has been found generally desirable to cut these grooves with mobile concrete saws having a pair of rotary cutting discs disposed in tandem. These discs are generally situated in staggered, vertical relationship so that the front disc cuts a groove of predetermined depth and the rear disc increases the depth of the groove by cutting an additional increment. Often the discs are arranged so that the front discs cut one-half of the total depth of the groove, and the trailing disc cuts the remaining half. For many purposes, a total groove depth of one-fourth of the thickness of the slab is desired.

The outer peripheral margin of each disc is thicker than the remaining portion of the disc to enhance the disc cutting capabilities by providing an annular region of relief proximal the cutting edge. When this thickened portion becomes worn on the sides so that it is not substantially thicker than the remaining portion of the disc, the disc must be discarded. Because of the expense involved in disc-replacement, it is important that the discs be kept in perfectly true alignment to minimize side wear on the cutting edges.

Various attempts have heretofore been made to provide concrete cutting saws having separately adjustable blades so that the depth of cut made by each saw could be adjusted. Although saws of this type have generally been successful, it has been virtually impossible to keep the blades of these saws in proper alignment because each blade is mounted on its own articulated frame member to permit vertical adjustment. Thus, short-blade life has resulted.

Accordingly, it is the primary object of this invention to provide a concrete saw having a pair of adjustable, tandem cutting discs which are mounted on a common frame member to insure proper blade alignment at all times.

Another important object of this invention is to provide a concrete saw having a self-propelled mobile frame comprising a plurality of pivotally interconnected frame sections to insure rapid adjustment of the blade-cutting positions.

Still a further object of this invention is to provide a concrete saw wherein each of the frame sections can be swung relative to other sections through relatively large arcs to permit substantial raising of the discs to facilitate disc replacement.

These and other objects of this invention will be further explained or become apparent from the following specification and claims.

In the drawings:
FIGURE 1 is a fragmentary, side elevational view of a concrete saw embodying the principles of this invention, parts being removed to reveal details of construction;
FIG. 2 is a top plan view of the concrete saw of FIG. 1, the tongue, engine and superstructure being removed to show the frame construction;
FIG. 3 is a fragmentary, vertical, cross-sectional view of the saw illustrated in FIG. 2, with parts appearing in elevation;
FIG. 4 is a schematic illustration of the saw frame showing the relative positions of the frame sections when the saws are adjusted to one position thereof; and
FIG. 5 is a schematic illustration similar to FIG. 4, but showing the relative positions when the saws are adjusted to another location.

The concrete saw broadly designated 10 chosen for illustration, comprises a primary frame 12 including a first planar frame section 14 and a secondary frame section 16 swingably interconnected with section 14. Section 14 is provided with a pair of spaced, parallel, elongated fore-and-aft members 18 of rigid construction and are integral at their respective forwardmost ends with diagonal members 20. The front ends of members 20 are interconnected, and a gusset 22 is rigidly secured between members 20 as by welding, for adding structural rigidity to section 14. As best seen in FIG. 3, gusset 22 comprises a top plate 22a and a bottom plate 22b.

A vertical plate 24 is welded at the front of members 20 to provide a wearing surface for a transversely extending axle 26 of a front wheel and axle assembly 28 for saw 10. Axle 26 may be of tubular construction and is pivotally connected to frame section 14 by structure including a pair of depending, parallel plates 30 which are welded intermediate the ends of axle 26 and are provided with aligned apertures receiving therethrough an elongated, transversely circular, fore-and-aft stub shaft 32. Shaft 32 is welded to plate 22b of gusset 22 and projects forwardly from plate 24 as clearly shown in FIGS. 1 and 3. It will be seen that the longitudinal axis of shaft 32 is parallel with the longitudinal axis of members 18.

Each end of axle 26 has a pair of outwardly projecting, vertically spaced plates 34 welded thereto which receive therebetween corresponding knuckle sections 36 for pivotally coupling spindles 38 at each end of axle 26. Each spindle 38 journals a wheel 40 for supporting frame 14. Manifestly, wheels 40 may include pneumatic tires or the like as illustrated in the drawings. Control arms 42 integral with corresponding spindles 38 are pivotally interconnected by a tie rod 44 for maintaining the respective front wheels 40 in proper alignment. A tongue 46 is pivotally coupled to axle 26 intermediate the ends of the latter, and a control rod 48 pivotally interconnects tongue 46 and tie rod 44 to permit steering of wheels 40 by tongue 46. An alternate control to permit manual steering of wheels 40 includes a bifurcated control lever 50 pivotally coupled to axle 26 proximal one end of the latter. An arm 52, having one end thereof pivotally coupled to lever 50 and the other end pivotally connected to the proximal arm 42, permits steering of both wheels 40 by an operator who may walk alongside of saw 10. A tongue extension assembly 54 may be coupled to tongue 46 through a horizontal shaft 56 for a purpose to be further described.

Frame section 16 is swingably interconnected to section 14 through an elongated, transversely circular shaft 58 passing through aligned apertures in members 18 and projecting beyond each side of section 14. Elongated, parallel side members 60 of frame section 16 are pivoted on the outer ends of shaft 58 for swinging about the longitudinal axis of the latter.

The outermost ends of members 60 are interconnected by an elongated, tubular axle housing 62 extending parallel to shaft 58 and projecting beyond either side of frame section 16. Suitable axles 64 project from either end of housing 62 and rear wheels 66 for saw 10 are journaled on axles 64. Manifestly, wheels 66 may also include pneumatic tires. Radial arms 68, welded to housing 62 and projecting rearwardly therefrom, include bearing structure 70 journaling a transverse drive shaft 72 which is operably coupled to a hydraulic motor 74 by a chain drive assembly 76. Power from motor 74 is transferred through shaft 72 to wheels 66 through separate drives 78. If desired, differential means (not shown) may be provided in the power train between motor 74 and wheels 66.

Power devices such as hydraulic piston and cylinder assemblies 80 are pivotally connected to members 18 by upstanding lugs 82 on the latter, and assemblies 80 are pivotally coupled to members 60 through upright arms 84, as shown best in FIGS. 1 and 2. The angular relationship between frame sections 14 and 16 may be adjusted through operation of the assemblies 80 as will be more fully explained hereinafter.

Retainer means 86 on shaft 58 proximal the outer ends of the latter, serve to secure members 60 on shaft 58. An elongated tube 88 is telescoped over shaft 58 between members 18. A rigid secondary frame broadly designated 90 is welded to tube 88 for swinging about shaft 58.

Frame 90 is planar and includes a pair of elongated, outer members 92 and an intermediate member 94 parallel to members 92. Members 92 and 94 are interconnected at opposed ends by cross members 96. As best shown in FIGS. 2 and 3, it will be seen that frame 90 is swingably mounted on shaft 58 adjacent one end of frame 90 so that the angular relationship between frame section 14 and frame 90 may be adjusted by swinging the latter about shaft 58.

An upright arm assembly 98 is mounted on the forwardmost cross member 96 and is pivotally coupled to the piston of a power unit in the nature of a fluid piston and cylinder assembly 100. The cylinder of the latter is pivotally coupled to gusset 22 by upstanding lug means 102. Manifestly, operating assembly 100 swings frame 90 with respect to frame section 14. A pair of cutting units 104 are mounted on frame 90 in tandem relationship and include bearing structure 106 for power shafts 108, and a pair of cutting discs 110 mounted on the latter proximal intermediate member 94 of frame 90.

Pulley means 112 on the ends of shafts 108 are operably interconnected to the power shaft 114 of a prime mover 116. The latter is mounted on a frame 118 which is pivotally secured to frame 90 by a transverse shaft 120 which permits swinging of prime mover 116 with respect to frame 90 for maintaining proper tension in the belts which couple prime mover 116 to the cutter assemblies 104. Lugs 122 and 124 are slotted and are alignable with apertures 126 in the forward end of frame 118 whereby the angular adjustment of the latter with respect to frame 90 may be releasably maintained through bolt means or the like. Prime mover 116 may be operably coupled with a water pump 128 for providing cooling liquid to the cutting region through suitable nozzles 130 disposed proximal the respective cutting discs 110. Prime mover 116 is also operably coupled with a hydraulic pump 132 which provides fluid to motor 74 through suitable conduits for imparting driving power to saw 10.

A hand pump 134 carried by frame section 14 is operably coupled to assemblies 80 and 100 for providing hydraulic fluid thereto in order to selectively operate either assembly 80 or assembly 100 as desired. Hydraulic valving means 136, operably coupled between pump 132 and motor 74, permits manual control of the latter for selectively starting and stopping motivation of saw 10 and controlling both forward and reverse movements of the latter.

In operation, saw 10 is moved onto a concrete slab in which it is desired that a line of weakness be cut into the slab for purposes heretofore explained. Tongue extension 54 permits saw 10 to be towed or, if desired, the latter can be propelled by its own power through operation of motor 74. Frame 90, which carries the cutting assemblies 104, is then lowered into position so that the outer peripheral edges of cutting discs 110 are disposed in proper vertical relationship with respect to the upper surface of the slab to be cut.

The precise relationship of discs 110 with respect to the surface of the slab will be governed by the depth of cut desired for each disc 110. Ordinarily, it is desired for the rearmost disc 110 to follow in the groove cut by the forwardmost disc 110 whereby the rearmost disc cuts an additional increment.

Frame 90 is moved into proper position with respect to the primary frame 12 through operation of assemblies 80 and 100. A valve 138 associated with pump 134 is manually operable to permit flow of fluid through the conduits interconnecting pump 134 and the respective assemblies 80 and 100. Additional manually operable valves 140 and 142 control the flow of fluid between assemblies 80 and 100 respectively, and pump 134. Thus, when it is desired to lower the front of frame 90 with respect to primary frame 12, both valves 138 and 142 are in proper position to relieve the fluid pressure on assembly 100 and to permit frame 90 to swing about shaft 58 under the influence of the weight of the superstructure and the frame 90 itself.

When the front end of frame 90 is in proper position, bringing the front disc 110 into the desired vertical relationship with respect to the surface of the slab, the rear end of frame 90 is lowered by relieving the fluid pressure on assembly 80 with proper manipulation of valves 140 and 138. This permits frame 16 to buckle with respect to frame 14 (as illustrated in FIG. 5) through the swinging of members 60 about shaft 58. It will be seen, particularly in FIG. 5, that such swinging movement lowers the rear of frame section 14 which carries with it the transverse shaft 58. Since the rear end of frame 90 is mounted on shaft 58, this end of frame 90 is lowered accordingly, bringing the rear disc 110 into the desired position. When the proper angular disposition of frame 90 is achieved, valve 138 may be closed to lock the frame sections in the desired relative dispositions so that saw 10 can be cause to traverse the slab while discs 110 are operated for cutting the groove in the slab. Steering for saw 10 can be achieved by lever 50.

It is sometimes desired that a pair of saws 10 be operated in tandem and tongue 54 is provided with an upstanding pin 144 whereby saw 10 can be towed behind a preceding saw or other towing vehicle. Further, a guide disc 146, mounted proximal the forward end of tongue 54, is adapted to travel within a groove cut into the slab by a preceding saw so that precise alignment of discs 110 with the groove will be maintained. This insures that the latter will further the groove cutting operation without imparting undesired additional width to the groove. Obviously, tongue assembly 54 can be omitted by removing shaft 56. In this event, saw 10 is steered through lever 50.

The advantages achieved by having both cutting discs 110 mounted on a common, rigid planar frame will be apparent to those skilled in the art inasmuch as both discs are thereby positively maintained in precise tandem alignment. This operates to minimize side wear on the blade discs themselves which contributes to longer life of the discs. Yet, the novel arrangement of the frame sections 14, 16 and frame 90 permits selective adjustment of either disc 110 to proper vertical relationship with respect to the slab so that accurate control over the depth of cut effected by each disc 110, can be maintained at all times. When it is desired to raise the discs 110 from their cutting positions, or to substantially elevated positions, as illustrated in FIG. 4 (which may be desirable for changing cutting discs or the like) this may be quickly and easily achieved. Raising of the cutting discs is accomplished by manipulation of valves 138, 140 and 142 to permit manual pumping of hydraulic fluid first to assembly 100 and then to assemblies 80. Valve 138 is then closed to lock the assemblies into their extended positions. It will be obvious that the operation for both raising and lowering of frame 90 can be carried out in a reverse manner wherein the assemblies 80 are operated before the operation of assembly 100.

Having thus described the invention, what is claimed as new and desired to be secured by Letters Patent is:

1. In a groove cutter:
   a front and a rear support;
   a primary frame spanning the distance between said supports;
   a secondary frame mounted on the primary frame for up-and-down swinging movement;
   means interconnecting the frames for swinging the second frame;
   a pair of cutter discs rotatably carried in tandem by said second frame, said primary frame having a pair of articulated sections;
   means for each section respectively attaching the same to a corresponding support for up-and-down swinging movement; and
   means interconnecting the sections for swinging the same and including an elongated, horizontally disposed shaft carried by one section, the other section being pivotally mounted on said shaft for swinging about the longitudinal axis of the latter, the axis of swinging movement of the secondary frame and the axis of articulation of said sections being coincidental whereby up-and-down movement of the secondary frame at said axis is responsive to swinging of the sections.

2. The invention of claim 1, wherein the means interconnecting the sections includes a fluid piston and cylinder device having means for releasably maintaining the sections in selected angular relationship and wherein the means interconnecting the frames includes a fluid piston and cylinder assembly operable for releasably maintaining the frames in selected angular relationship.

3. The invention of claim 1, wherein said second frame is pivotally mounted on said shaft.

4. In a groove cutter:
   a front and rear wheel and axle assembly;
   a primary frame spanning the distance between said assemblies;
   a secondary frame mounted on the primary frame for swinging movement through a vertical arc about a horizontal axis;
   a first fluid piston and cylinder assembly interconnecting the frames for swinging the second frame with respect to the first frame;
   a pair of cutter discs rotatably carried in tandem by said second frame, said primary frame having a pair of articulated sections, said sections being hingedly interconnected for relative swinging movement about a horizontal axis, said axis extending transversely of the primary frame intermediate said wheel and axle assemblies and coinciding with the axis of swinging movement of said secondary frame;
   means for each section respectively attaching the same to each assembly for swinging movement through a vertical arc about the corresponding axles; and
   a second fluid piston and cylinder assembly interconnecting the sections for swinging the same.

References Cited
UNITED STATES PATENTS

| 909,059 | 1/1909 | Card | 299—28 |
| 2,751,205 | 6/1956 | Peterson | 299—40 |
| 3,141,702 | 7/1964 | Barton | 299—39 |

ERNEST R. PURSER, *Primary Examiner.*